(12) United States Patent
Shaver et al.

(10) Patent No.: US 9,699,966 B2
(45) Date of Patent: Jul. 11, 2017

(54) MOWER DECK SPINDLE COVER

(71) Applicant: Deere & Company, Moline, IL (US)

(72) Inventors: Patrick Shaver, Eden Prairie, MN (US); Melissa Tolson, Horicon, WI (US); Kyle T. Ressler, West Bend, WI (US)

(73) Assignee: DEERE & COMPANY, Moline, IL (US)

( * ) Notice: Subject to any disclaimer, the term of this patent is extended or adjusted under 35 U.S.C. 154(b) by 161 days.

(21) Appl. No.: 14/522,726

(22) Filed: Oct. 24, 2014

(65) Prior Publication Data

US 2016/0113198 A1    Apr. 28, 2016

(51) Int. Cl.
| | |
|---|---|
| *A01D 34/81* | (2006.01) |
| *A01D 34/82* | (2006.01) |
| *A01D 101/00* | (2006.01) |
| *A01D 34/66* | (2006.01) |

(52) U.S. Cl.
CPC ........... *A01D 34/81* (2013.01); *A01D 34/828* (2013.01); *A01D 34/66* (2013.01); *A01D 2101/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,212,244 A | * | 10/1965 | Wilgus | A01D 34/74 56/11.9 |
| 4,226,074 A | * | 10/1980 | Mullet | A01D 34/71 56/13.6 |
| 5,410,867 A | * | 5/1995 | Plamper | A01D 42/005 49/386 |
| 5,442,902 A | * | 8/1995 | Mosley | A01D 42/005 56/17.5 |
| 5,836,144 A | | 11/1998 | Hohnl et al. | |
| 5,910,091 A | * | 6/1999 | Iida | A01D 34/78 56/16.7 |
| 6,434,918 B1 | | 8/2002 | Csonka et al. | |
| 7,610,742 B2 | * | 11/2009 | Imanishi | A01D 34/71 56/320.1 |
| 7,735,305 B1 | | 6/2010 | Cozine et al. | |
| 8,763,355 B2 | | 7/2014 | Sugio | |
| 2006/0254236 A1 | | 11/2006 | Goebert et al. | |
| 2007/0084176 A1 | | 4/2007 | Chenevert et al. | |

FOREIGN PATENT DOCUMENTS

| | | |
|---|---|---|
| CA | 2262107 A1 | 12/1999 |
| CA | 2350301 A1 | 12/2001 |
| EP | 0966877 A1 | 12/1999 |

OTHER PUBLICATIONS

Search Report issued in counterpart application No. GB1518821.2, dated Apr. 7, 2016 (4 pages).

* cited by examiner

*Primary Examiner* — Alicia Torres

(57) ABSTRACT

A mower deck spindle cover includes a panel that covers a spindle pocket on a mower deck in a lowered position. The spindle cover is attached to a mounting arm for pivoting between the lowered position and a raised position. A torsion spring biases the panel to the lowered position. The spindle cover cannot be removed from the mower deck unless the mower deck is separated from the tractor or vehicle.

15 Claims, 5 Drawing Sheets

MOWER DECK SPINDLE COVER

FIELD OF THE INVENTION

This invention relates generally to rotary mower decks carried by tractors or other vehicles. More specifically, the invention relates to spindle covers for multi-blade mower decks.

BACKGROUND OF THE INVENTION

Tractors, utility vehicles or zero turn mowers used for lawn care may carry a mower deck covering two or more rotary cutting blades on the lower ends of vertically oriented spindles. A mower deck may be attached to the vehicle with mechanical linkages that allow the deck to be carried at a range of different cutting heights, and raised or lowered between each height. The blade spindles may be rotated by one or more belts and pulleys above the top surface of the deck, which may be driven by a belt and/or power take off shaft connected to the engine or other power source. Each blade spindle may be mounted in a spindle pocket or well in the deck's top surface. For operator safety and shielding, spindle covers may be attached using hardware such as threaded fasteners through the top surface of the deck. The spindle covers are located over the pockets or wells, guarding the spindle pockets and pulleys on the upper ends of the spindles.

It is desirable to periodically remove the spindle covers to perform service and maintenance work on the mower deck. This work may include cleaning out grass clippings and debris that collects in the spindle pockets, greasing the spindle bearings, and removing or replacing the belt. A wrench or socket may be used to loosen and disconnect the threaded fasteners or other hardware connecting each spindle cover to the mower deck. Operators who lack the time or the right tools to remove and reinstall the spindle covers may skip the service and maintenance work on the mower deck.

There is a need for a mower deck spindle cover that helps reduce or minimize the time required to perform service and maintenance work on a mower deck. There is a need for a mower deck spindle cover that provides easy access to each spindle pocket of the mower deck without tools or fasteners. There is a need for a mower deck spindle cover that may not be removed from the mower deck unless the mower deck is separated from the tractor or vehicle and not operational. There is a need for a mower deck spindle cover that is not complex and includes relatively few parts.

SUMMARY OF THE INVENTION

A mower deck spindle cover includes a panel having a generally horizontal surface, a sidewall extending at least partially around an outer perimeter of the panel, a rim along the sidewall, and an opening where a belt travels under the panel and engages a pulley on a mower deck. A mounting arm may be secured to the spindle pocket and pivotably attached to the panel so that the panel can pivot between a lowered or guarded position covering the spindle pocket and a raised or service position exposing the spindle pocket. A spring connected to the mounting arm biases the panel to the guarded position. The mower deck spindle cover may not be removed from the mower deck unless the mower deck is separated from the tractor or vehicle and not operational, and the panel is pivoted past the raised position to a disengagement position.

The mower deck spindle cover helps reduce or minimize the time required to perform service and maintenance work on a mower deck, provides easy access to each spindle pocket of the mower deck. Additionally, the mower deck spindle cover is not complex and includes relatively few parts.

DESCRIPTION OF THE PREFERRED EMBODIMENT

Figure 1:
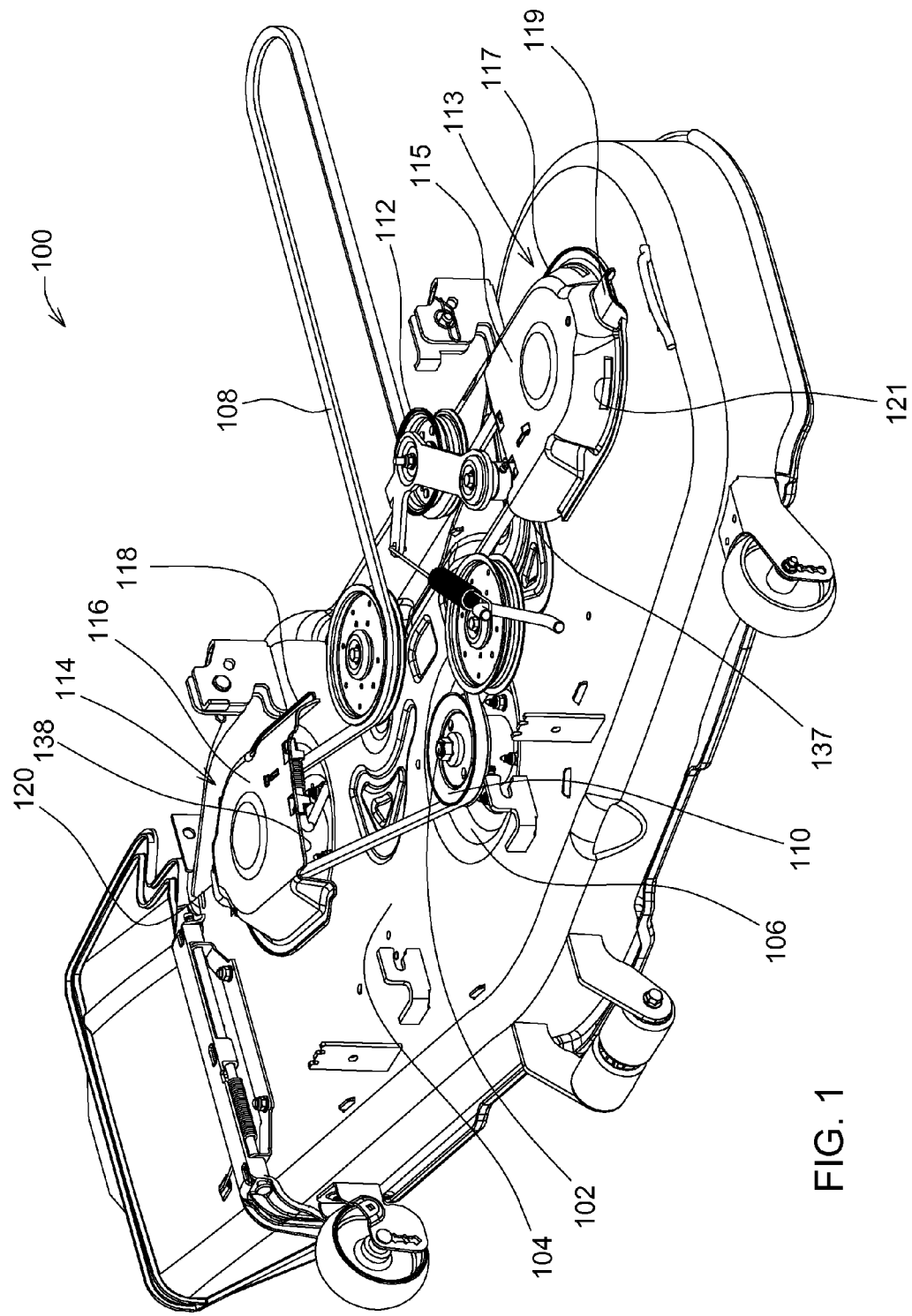
FIG. 1 is a top perspective view of a mower deck having a pair of spindle covers in a lowered or guarded position according to an embodiment of the invention.

As shown in FIGS. 1-5, in one embodiment, mower deck 100 may be positioned under a tractor, utility vehicle or zero turn mower 150, preferably between the front and rear wheels. The mower deck may cover a plurality of rotary cutting blades mounted on the lower ends of vertically oriented blade spindles 101, 102, 103. Alternatively, the mower deck may cover two cutting blades, or more than three cutting blades. The mower deck may have a generally horizontal top 104 with a plurality of spindle pockets or wells 105, 106, 107 where the spindles may be mounted. Rubber belt 108 may engage pulleys 109, 110, 111 mounted to the spindles. When idler pulley 112 moves the belt into engagement with the spindle pulleys, the belt provides power from an internal combustion engine or other power source to rotate the mower blades.

In one embodiment, each mower deck spindle cover 113, 114 may be positioned over a spindle pocket 105, 107. Optionally, a third spindle cover may be positioned over spindle pocket 106. Each spindle cover may have a wall thickness of less than about 10 mm, and may be plastic or other light weight material. Each spindle cover may have a panel 115, 116 with a surface area that extends over the spindle pocket so that the panel may cover the pulley and spindle. Each spindle cover also may include a sidewall 117, 118 extending downwardly from the panel and may angle out from the panel at least partially around the spindle cover's outer perimeter, and a lower rim.

In one embodiment, while the spindle cover is in the lowered or guarded position of FIG. 1, panel 115, 116 may be above the top surface of the mower deck, and the lower rim at the base of the sidewall may contact the top of the mower deck. Optionally, each spindle cover also may include a handle 119, 120 projecting outwardly from the sidewall, one or more slots or openings 121, 122 in the sidewall for providing access to the spindle pocket for cleaning out the spindle with compressed air, and optionally may include a tab 123 that serves as a belt keeper.

In one embodiment, the spindle cover may have an opening or open end 137, 138 under one end of the panel.

The opening or open end is where belt 108 travels under the panel and engages the pulley covered by the spindle cover. The spindle cover may be pivotably connected to a mounting arm 127, 128 adjacent the opening. Each mounting arm also may be attached to the mower deck.

Figure 2:
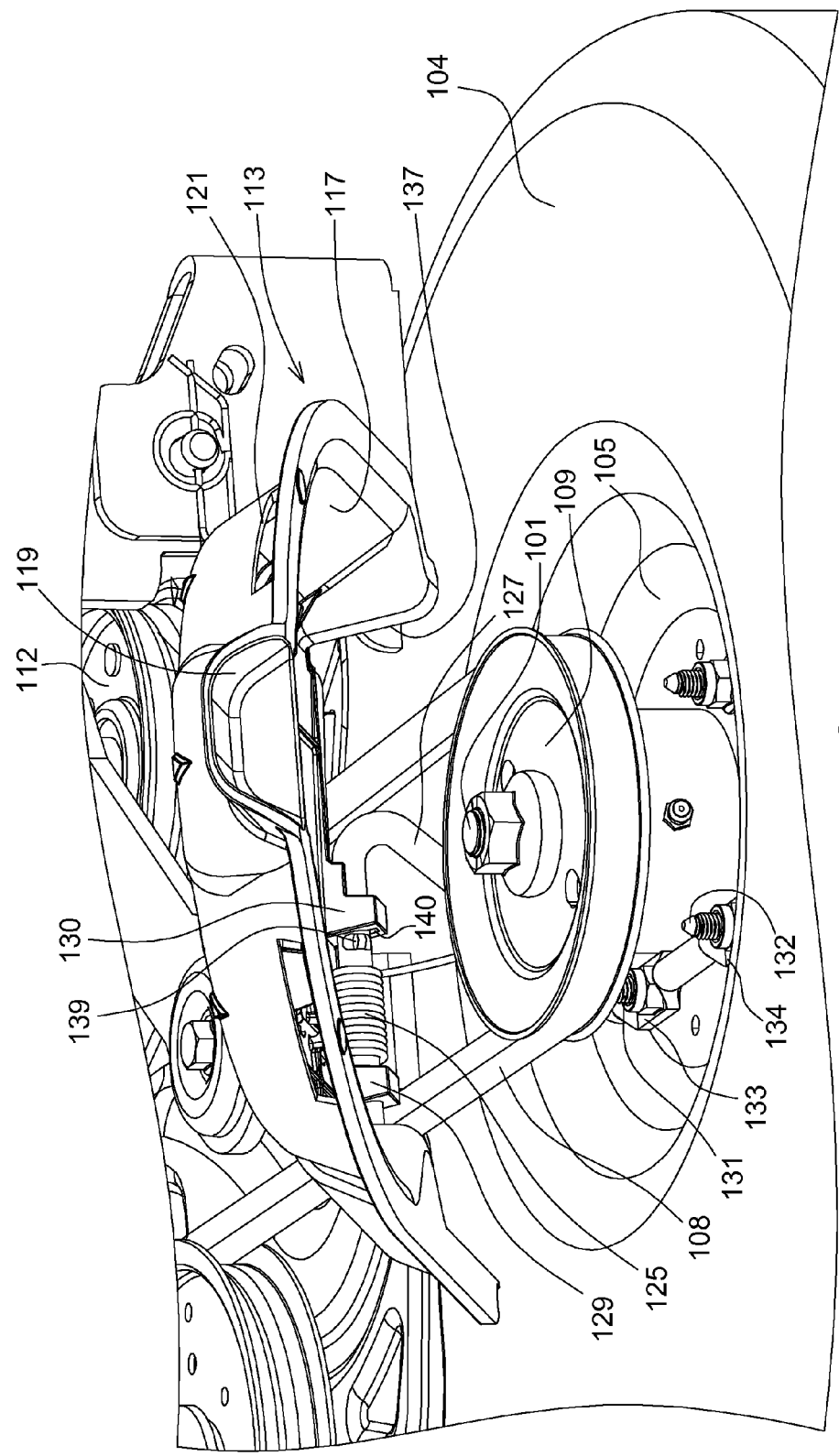
FIG. 2 is a top perspective view of a first mower deck spindle cover in a raised or service position according to a first embodiment of the invention.
Figure 3:
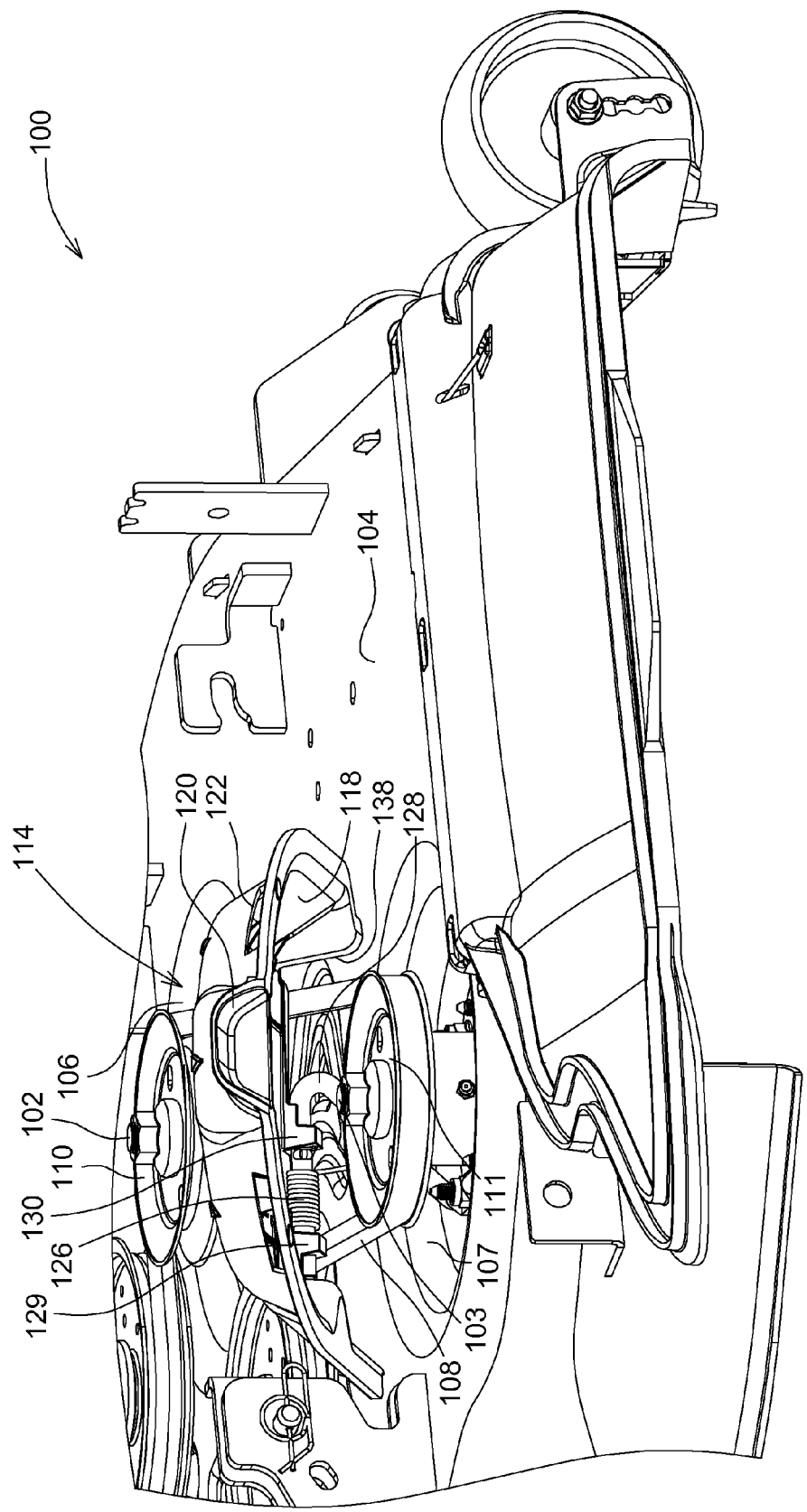
FIG. 3 is a top perspective view of a second mower deck spindle cover in a raised or service position according to a first embodiment of the invention.
Figure 4:
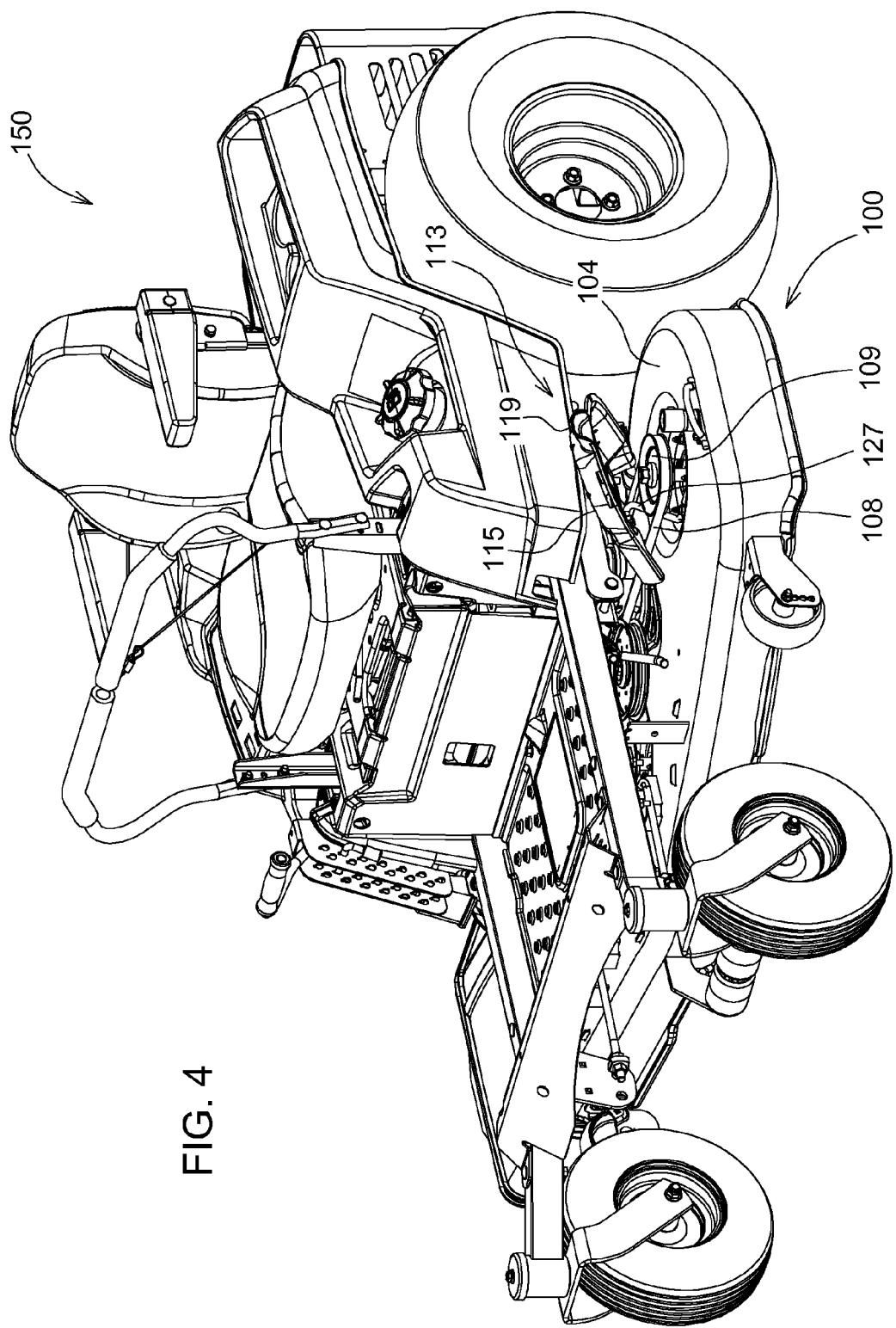
FIG. 4 is a top perspective view of a zero turn mower with a mower deck and a spindle cover in the raised or service position according to a first embodiment of the invention.
Figure 5:
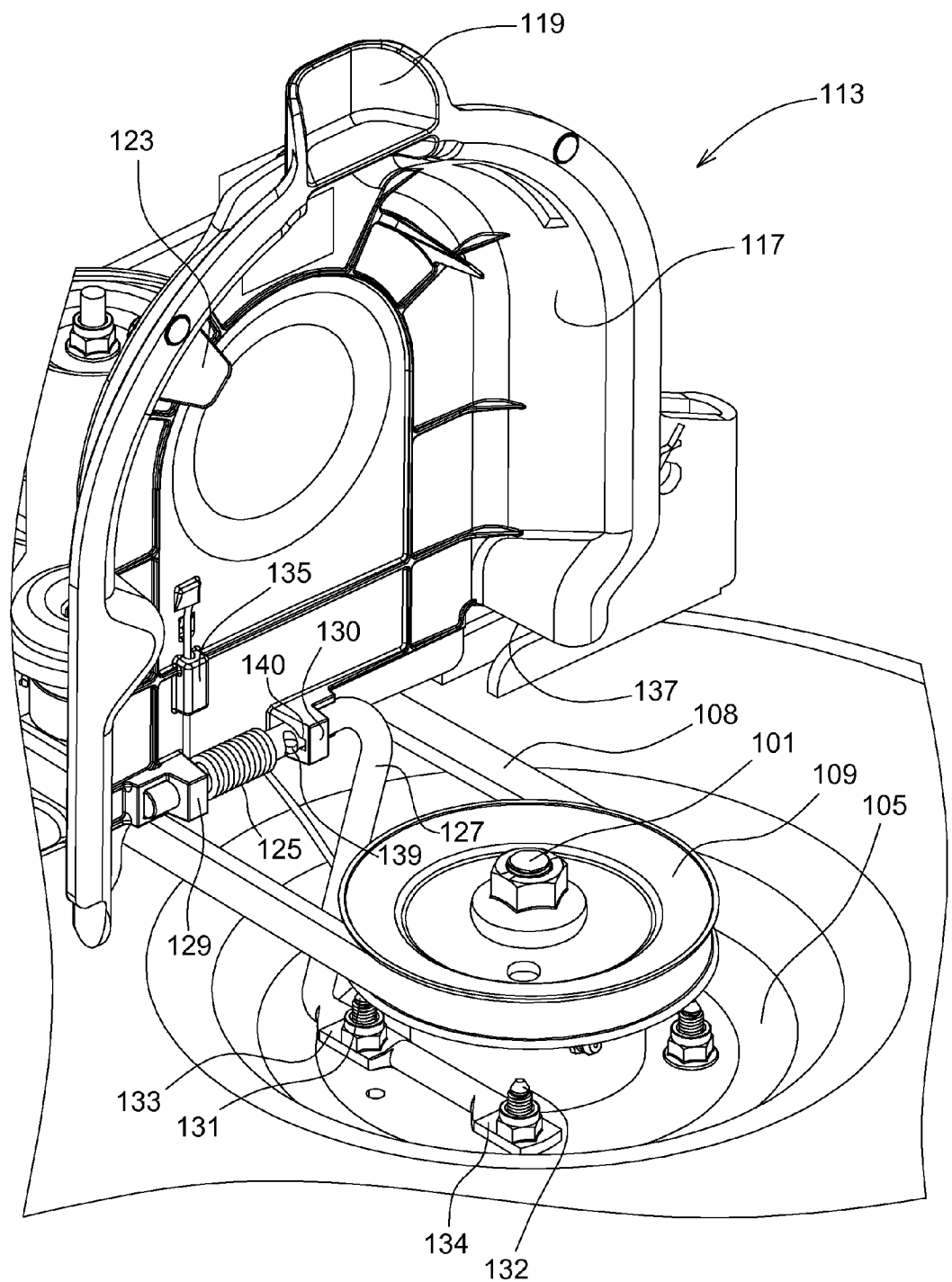
FIG. 5 is a top perspective view of a spindle cover in a disengagement position according to a first embodiment of the invention.

In one embodiment, the spindle cover may pivot between the lowered or guarded position shown in FIG. 1 and a raised or service position shown in FIGS. 2 and 3. Each spindle cover may be biased to pivot back into the lowered or guarded position. To pivot the spindle cover from the lowered or guarded position to the raised or service position, an operator may lift handle 119, 120 on the sidewall. The chassis, operator station and/or body of the tractor or vehicle blocks the spindle covers from being raised more than about 45 degrees (and less than about 85 degrees) to the raised or service position, as shown in FIG. 4. In the raised or service position, the operator may clean out grass clippings and debris that collects in the spindle pocket, grease the spindle bearings, or remove or replace the belt. No tool such as a wrench or socket is required to pivot the spindle cover up or down between the lowered or guarded position and the raised or service position. The operator may release the handle and a spring may bias the spindle cover to pivot back to the lowered or guarded position.

In one embodiment, torsion spring 125, 126 may bias each spindle cover to the lowered or guarded position. The torsion spring may be positioned around a first end of mounting arm 127, 128, and one end of the torsion spring may be captured by retainer 135 on the underside of the spindle cover.

In one embodiment, mounting arm 127, 128 may be a wireform extending through one or more sleeves 129, 130 on the underside of the panel near the opening or open end of the spindle cover. Alternatively, the mounting arm may be a bracket that provides a hinged connection to the panel. A second end of the wireform or bracket may be mounted to the mower deck, preferably in the spindle pocket. The wireform or bracket may be mounted to the mower deck using the same spindle studs 131, 132 that secure the blade spindle housings to the mower deck. For example, the spindle studs may extend through holes in flange sections 133, 134 near the second end of the wireform or bracket, and secured by nuts.

In one embodiment, spindle covers 113, 114 are not removable from the mower deck if the mower deck is mounted under the tractor or vehicle in an operating mode. With the mower deck in an operating mode under the tractor or vehicle, the tractor or vehicle chassis, operator station and/or body blocks the operator from pivoting the spindle covers up past the raised or service position (which may be no more than about 45 to about 85 degrees from the lowered or guarded position). Ear 139 projects from mounting arm 127 and prevents the operator from disengaging and sliding sleeve 130 out from around mounting arm 127. However, if the mower deck is separated from the tractor or vehicle, and is not operational, the operator may pivot the spindle covers past the raised or service position to a disengagement position shown in FIG. 5. The disengagement position is preferably at a specific angle substantially greater than the raised or service position, and preferably at least about 100 degrees, and most preferably in the range of about 110 degrees to about 120 degrees. In the disengagement position, ear 139 may be aligned with slot 140 in sleeve 130 allowing the operator to detach the panel by sliding sleeve 130 out from mounting arm. As a result, the spindle covers are not removable from the mounting arms on the mower deck unless the mower deck is separated from the tractor or vehicle, and the spindle covers are pivoted to a specified disengagement position.

Having described the preferred embodiment, it will become apparent that various modifications can be made without departing from the scope of the invention as defined in the accompanying claims.

The invention claimed is:

1. A mower deck spindle cover comprising:
   a panel having a sidewall extending downwardly from the panel, and an opening under one end of the panel;
   a mounting arm pivotably attached to the panel for pivoting the panel and sidewall between a lowered position and a raised position;
   a spring biasing the panel and sidewall to the lowered position wherein the panel covers one of a plurality of pulleys on a plurality of spindles mounted to a horizontal top surface of a mower deck; and
   a projection on the mounting arm that prevents disengagement of the panel from the mounting arm unless the panel is pivoted to a disengagement position at a specified angle greater than the raised position and aligned with the projection.

2. The mower deck spindle cover of claim 1 wherein the spring is a torsion spring around a first end of the mounting arm.

3. The mower deck spindle cover of claim 1 further comprising a handle projecting outwardly from the sidewall.

4. The mower deck spindle cover of claim 1 further comprising at least one spindle stud extending through a hole in the mounting arm and securing the mounting arm.

5. The mower deck spindle cover of claim 1 wherein the mounting arm is pivotably attached to the panel adjacent the opening.

6. The mower deck spindle cover of claim 1 wherein the mounting arm is a wireform.

7. A mower deck spindle cover comprising:
   a panel having a surface area covering one of a plurality of pulleys on spindles mounted in spindle pockets in a top surface of a mower deck in a lowered position;
   a mounting arm attached between the panel and the spindle pocket; the panel having an underside pivotably attached to the mounting arm and pivotable between the lowered position and a raised position in which the panel does not cover one of the plurality of pulleys; the panel biased to the lowered position; and
   an ear projecting from the mounting arm that must be aligned with a slot on the underside of the panel to detach the panel from the mounting arm.

8. The mower deck spindle cover of claim 7 wherein the ear is aligned with the slot only if the panel is pivoted past the raised position to a disengagement position.

9. The mower deck spindle cover of claim 7 wherein the mounting arm is attached to a plurality of spindle studs extending through the spindle pocket on the mower deck.

10. The mower deck spindle cover of claim 7 wherein the mounting arm is a wireform.

11. The mower deck spindle cover of claim 7 further comprising a torsion spring connected to the mounting arm to bias the panel to the lowered position.

12. The mower deck spindle cover of claim 7 further comprising a sidewall extending downwardly from the panel and a handle on the sidewall.

13. A mower deck spindle cover comprising:
   a panel having a generally horizontal surface, a sidewall extending at least partially around an outer perimeter of the panel, a rim along the sidewall, and an opening where a belt travels under the panel and engages one of a plurality of pulleys mounted in one of a plurality of spindle pockets in a horizontal top surface of a mower deck; each pulley mounted to spindle with a mower blade attached thereto;

a mounting arm secured to the spindle pocket and pivotably attached to the panel so that the panel can pivot between a guarded position covering the pulley and the spindle pocket, a service position exposing the pulley and the spindle pocket, and a disengagement position where an ear on the mounting arm is aligned with a slot in the panel; and a spring connected to the mounting arm and biasing the panel to the guarded position.

14. The mower deck spindle cover of claim 13 further comprising a plurality of spindle studs that secure the mounting arm to the spindle pocket.

15. The mower deck spindle cover of claim 13 wherein the mounting arm is a wireform.

\* \* \* \* \*